US006316113B1

(12) United States Patent
Russell, Jr. et al.

(10) Patent No.: US 6,316,113 B1
(45) Date of Patent: Nov. 13, 2001

(54) FLEXIBLE LOOP LEVELING BLADE FOR FLOW COATING PROCESS FOR MANUFACTURE OF POLYMERIC PRINTER ROLL AND BELT COMPONENTS

(75) Inventors: James G. Russell, Jr., Fairport; Sandra L. Schmitt, Williamson; Craig A. Zufelt, Farmington, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/334,418

(22) Filed: Jun. 16, 1999

(51) Int. Cl.$^7$ .................... B32B 15/04

(52) U.S. Cl. .................... 428/450; 428/332; 428/461; 428/469

(58) Field of Search .................... 428/334, 422, 428/448, 463, 447, 192, 332, 457, 450, 461, 469

(56) References Cited

U.S. PATENT DOCUMENTS

| | | | | |
|---|---|---|---|---|
| 3,616,046 | | 10/1971 | Benzinger et al. | 156/331 |
| 4,034,709 | | 7/1977 | Fraser et al. | 118/658 |
| 4,278,733 | | 7/1981 | Benzinger | 428/413 |
| 4,327,008 | | 4/1982 | Schimmel et al. | 425/104 |
| 4,372,246 | | 2/1983 | Azar et al. | 118/60 |
| 4,891,081 | | 1/1990 | Takahashi et al. | 156/78 |
| 5,177,538 | | 1/1993 | Mammino et al. | 355/259 |
| 5,245,392 | | 9/1993 | Behe et al. | 355/259 |
| 5,300,339 | | 4/1994 | Hays et al. | 428/36.9 |
| 5,378,525 | | 1/1995 | Yamamoto et al. | 428/192 |
| 5,386,277 | * | 1/1995 | Hays et al. . | |
| 5,410,005 | | 4/1995 | Nemoto et al. | 526/245 |
| 5,416,566 | | 5/1995 | Edmunds et al. | 355/253 |
| 5,448,342 | | 9/1995 | Hays et al. | 355/259 |
| 5,455,077 | | 10/1995 | Yamamoto et al. | 427/425 |
| 5,695,878 | | 12/1997 | Badesha et al. | 428/334 |
| 5,700,568 | * | 12/1997 | Badegha et al. . | |
| 5,871,832 | * | 2/1999 | Finn et al. . | |

FOREIGN PATENT DOCUMENTS

| | | |
|---|---|---|
| 4-11966 | 1/1992 | (JP) . |
| 7-178367 | 7/1995 | (JP) . |

* cited by examiner

*Primary Examiner*—Merrick Dixon
(74) *Attorney, Agent, or Firm*—Andrew D. Ryan

(57) ABSTRACT

A guide for leveling the flow of a coating onto a substrate of a component in a machine is provided. The substrate is rotatable about a longitudinal axis, whereby the coating is spirally applied to the substrate. The guide includes a member operably associated with the flow of the coating and operably associated with a slide movable with a direction parallel to the longitudinal axis. The member has a first end fixedly secured to the slide. The member has a second end spaced from the first end and fixedly secured to the slide. The member is resiliently cooperable with the periphery of the substrate and has a surface thereof slightly spaced from the periphery of the substrate. At least a portion of the flow of the coating may be positionable between the periphery of the substrate and the surface of the member so as to assist in evenly distributing the coating on the periphery of the substrate.

22 Claims, 11 Drawing Sheets

FLEXIBLE LOOP LEVELING BLADE FOR FLOW COATING PROCESS FOR MANUFACTURE OF POLYMERIC PRINTER ROLL AND BELT COMPONENTS

The present invention relates to a method and apparatus for a printing system. More specifically, the invention relates to printer rolls and belts for printing systems.

The features of the present invention are useful in the printing arts and more particularly in electrophotographic printing. In the well-known process of electrophotographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate or support member (e.g., paper), and the image affixed thereto by fusing the toner image to the paper to form a permanent record of the image to be reproduced. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways.

Several components in the electrophotographic printing process described above are in the form of polymeric rolls and belts. Fusing rolls which are used to fix the toner image on a substrate represent a component that is typically in the form of polymeric rolls and belts. Also included among these components are bias charge rolls (BCRS) and bias transfer rolls (BTRs) which electrostatically charge the photoreceptor. Other forms of polymeric rolls and belts include the pressure or backup roll used with a fusing roll to fix the toner image on a substrate. Another form of a polymeric rolls and belts are donor rolls which transfer oil to the fuser roll that assists in releasing the toner from the fuser roll. A further form of polymeric rolls and belts include intermediate transfer rolls and belts that transfer developed images. Another form of polymeric rolls and belts include photoconductive belts and rolls. Other forms of polymeric rolls and belts include those belts and rolls used in Hybrid Scavangeless Development (HSD) as disclosed in U.S. Pat. No. 4,868,600 to Hays et al. and in U.S. Pat. No. 5,172,170 to Hays et al., the relevant portions thereof incorporated herein by reference. All of these a polymeric rolls and belts are typically manufactured by spraying or by dipping A particularly difficult polymeric rolls and belts to manufacture are fuser rolls and belts. The elevated temperatures and pressures of these rolls and the accurate size and finish requirements necessary to insure proper copy quality make their manufacture difficult.

The fusing of the toner image to the paper to form a permanent record of the image is an important part of the xerographic process. Fusing of the toner image is typically done by heat fixation. The heat fixation may be in the form of radiation, conduction, convection or induction. Most modern xerographic processes utilize conduction heating of the toner image to adhere the image to the paper. This is performed by a fusing roll in contact with the toner image. A fusing roll is placed in rolling contact with a backup roll forming a nip therebetween. The paper having the toner image lying thereon is fed between the rolls through the nip. Heat from the fusing roll together with the pressure within the nip between the fuser roll and the backup roll serve to fuse the image to the paper. Heat is typically applied internally within the roll and is transferred through the substrate of the roll onto the periphery of the roll and onto the paper. The rolls typically include a thermally conductive substrate with a surface layer which is also thermally conductive. To assure uniform transfer of the image onto the paper, typically the fuser roll coating is conformable to the paper. For example, the coating may be in the form of a rubber or polymer material, e.g. a fluoroelastomer coating.

Applying fluoroelastomer and other rubber type coatings to fuser roll substrates are fraught with many problems. The coating may be applied to the substrate by two typical methods which are dipping of the substrate into a bath of coating solution or spraying the periphery of the substrate with the coating material.

Spraying is the typical method for the manufacture of fluoroelastomer rollers. The spraying process is very slow and costly. Also, the spraying process requires having the coating solution in a form that is very volatile including many volatile organic chemicals. Further, the spraying process is very prone to air pockets or pits forming in the coating. These pits or air pockets in the coating material of the roll result in improper fusing and poor image quality. Because of the nature of the spray process, much of the coating material is lost in the atmosphere requiring an excess amount of the expensive coating material utilized. Also, the loss of the volatile chemicals result in expensive containment costs for systems to contain the volatile chemicals as well as disposal costs of these materials. This invention is intended to alleviate at least some of the above-mentioned problems for at least some of the several components in the electrophotographic printing process described above which are in the form of polymeric rolls and belts.

Recently a process has been attempted to drip material over a horizontally rotating cylinder. With this process a portion of the material adheres to the cylinder and the remainder drips from the cylinder. The amount of material added to the roll is not precisely controlled as the percentage that adheres varies as parameters change over the production run. Also the material forms a wavy surface where the material is poured.

Recently, a new process has been developed for the spiral coating of polymeric printer roll and belt components. It is more fully described in U.S. Pat. No. 5,871,832 which reference is totally incorporated herein by reference and which is assigned to the same assignee as the instant application.

Referring now to FIG. 11, a prior art leveling device for use with the flow coating process for manufacturing polymeric printer roll and belt components is shown. The leveling apparatus 1A utilizes a blade 2A including a fixed end 3A which is attached to an axially moving slide 4A on the first end 3A of the blade 2A. The blade 2A includes free end 5A which flexibly cooperates with a coating 6A placed on a surface 7A of a roll 8A. The coating 6A is placed between the free end 5A of the blade 2A and the roll 8A. The flexible blade 2A is utilized to more evenly distribute the coating 6A on the roll 8A.

The flow coating process utilizing the blade having a free end and shown in FIG. 11 is generally successful in providing accurate coatings to roll and belt components. However, the use of the blade with a free end has certain difficulties. One of these problems is that the free end blade has only limited control over the tension or force applied by the blade 2A against the roll. The blade thickness may be changed as well as the deflecting angle of the blade but both adjustments are crude and not particularly reliable. Further, the free end of the blade is subject to wear which may be quite rapid on the blade. The wear on the blade may affect the force that the blade applies to the coating and the effectiveness of the blade. The present invention is directed to alleviate at least some of the aforementioned problems.

The following disclosures may be relevant to various aspects of the present invention:

U.S. Pat. No. 5,871,832
Patentee: Finn, et al.
Issue Date: Feb. 16, 1999

U.S. Pat. No. 5,700,568
Patentee: Badesha, et al.
Issue Date: Dec. 23, 1997

U.S. Pat. No. 5,695,878
Patentee: Badesha, et al.
Issue Date: Dec. 9, 1997

U.S. Pat. No. 5,455,077
Patentee: Yamamoto, et al.
Issue Date: Oct. 3, 1995

U.S. Pat. No. 5,448,342
Patentee: Hays, et al.
Issue Date: Sep. 5, 1995

U.S. Pat. No. 5,416,566
Patentee: Edmunds, et al.
Issue Date: May 16, 1995

U.S. Pat. No. 5,410,005
Patentee: Nemoto, et al.
Issue Date: Apr. 25, 1995

U.S. Pat. No. 5,386,277
Patentee: Hays, et al.
Issue Date: Jan. 31, 1995

U.S. Pat. No. 5,378,525
Patentee: Yamamoto, et al
Issue Date: Jan. 3, 1995

U.S. Pat. No. 5,300,339
Patentee: Hays, et al
Issue Date: Apr. 5, 1994

U.S. Pat. No. 5,245,392
Patentee: Behe, et al.
Issue Date: Sep. 14, 1993

U.S. Pat. No. 5,177,538
Patentee: Mammino, et al.
Issue Date: Jan. 5, 1993

U.S. Pat. No. 4,891,081
Patentee: Takahashi, et al.
Issue Date: Jan. 2, 1990

U.S. Pat. No. 4,372,246
Patentee: Azar, et al.
Issue Date: Feb. 8, 1983

U.S. Pat. No. 4,327,008
Patentee: Schimmel, et al.
Issue Date: Apr. 27, 1982

U.S. Pat. No. 4,278,733
Patentee: Benzinger
Issue Date: Jul. 14, 1981

U.S. Pat. No. 4,034,709
Patentee: Fraser, et al.
Issue Date: Jul. 12, 1977

U.S. Pat. No. 3,616,046
Patentee: Benzinger, et al.
Issue Date: Jun. 10, 1968

Japanese Kokai Patent Application No. HEI 4{1992}-11966
Applicant: Usaki, et al.
Filing Date: Apr. 27, 1990

Japanese Kokai Patent Application No. HEI 7{1995}-178367
Applicant: Aoki
Filing Date: Dec. 22, 1993

XEROX DISCLOSURE JOURNAL
Vol.21, No. 2 March/April 1996
Title: Flow Coating Fixture
Author: Richard C. Mark Rubber World Magazine
New Roll-Covering Process Uses RTV Silicones
Author: Kasnick
Published Date: May 1975

U. S. application Ser. No. 08/672,493
Applicants: Finn, et al.
Filing Date: Jun. 26, 1996

U.S. Pat. No. 5,871,832 discloses a guide for leveling the flow of a coating from a nozzle onto a generally cylindrical substrate of a polymeric printing component in a printing machine. The substrate is rotated about its longitudinal axis by a turning apparatus having a axially movable slide for mounting the nozzle to the slide. The coating is spirally applied to the substrate. The guide includes a member operably associated with the slide and moves with the slide. The member has a surface parallel to and slightly spaced from the periphery of the substrate so as to assist in evenly distributing the coating on the periphery of the substrate.

U.S. Pat. No. 5,700,568 discloses a fuser system member having a supporting substrate and a basic metal oxide-free outer surface layer of the reaction product of a fluoroelastomer, a polymerization initiator, a polyorganosiloxane and an amino silane.

U.S. Pat. No. 5,695,878 discloses fluoroelastomer surfaces for fuser members and a method for fusing thermoplastic resin toner images to a substrate using fuser surfaces, including a method for forming these surfaces which includes dissolving a fluoroelastomer; adding an amino silane to form a resulting homogeneous fluoroelastomer solution; and subsequently providing a layer of the homogeneous fluoroelastomer solution to the supporting substrate.

U.S. Pat. No. 5,455,077 discloses a crowned resilient roll of continuously increasing diameter from the axially opposed ends. The resilient roll includes a columnar roll body formed of a resilient material and a coating layer formed on an outer circumferential surface of the roll body. The coating is applied to a rotating body with the speed of the rotating body being decreased in the middle of the roll.

U.S. Pat. No. 5,448,342 discloses a coated transport roll including a core with a coating of charge transporting molecules and an oxidizing agent dispersed in a resin. The transporting molecules includes aryldiamine molecules.

U.S. Pat. No. 5,416,566 discloses a magnetic roll assembly including a rotatable nonconductive shell surrounding a magnetic member to prevent eddy currents during rotation. The substrate has an elastomer coating formed over it.

U.S. Pat. No. 5,410,005 discloses a reflection preventing film comprising a copolymer, its salt or both of them, the copolymer having at least one recurring unit selected from the group consisting of recurring units represented by formulas (1) and (2) and at least one recurring unit represented by formula (3): wherein R<1>–R<4> which may be the same as or different from one another, represent hydrogen atoms or organic groups and X represents a carboxyl group or a sulfo group, [See Original Patent for Chemical Structure Diagram] (3) wherein R<5> represents a hydrogen atom or an organic group, A represents a fluoroalkyl group and Y represents an alkylene group or a fluoroalkylene group. The reflection preventing film is formed on a resist film before irradiation in the formation of a resist pattern, thereby preventing the radiation reflected on the substrate from re-reflecting at the upper interface of the resist film to provide a resist pattern excellent in resolution, developability and pattern form.

U.S. Pat. No. 5,386,277 discloses a coated toner transport roller including a core with a coating of an oxidized polyether carbonate.

U.S. Pat. No. 5,378,525 discloses a crowned resilient roll of continuously increasing diameter from the axially opposed ends. The resilient roll includes a columnar roll body formed of a resilient material and a coating layer formed on an outer circumferential surface of the roll body. A protective layer of N-methoxymethlated nylon is applied to the coating.

U.S. Pat. No. 5,300,339 discloses a coated toner transport roll containing a core with a coating of transporting molecules dispersed in a binder and an oxidizing agent of ferric chloride and/or trifluoroacetaic acid.

The coating possesses a relaxation time of from about 0,0099 millisecond to about 3.5 milliseconds and a residual voltage of from about 1 to about 10 volts.

U.S. Pat. No. 5,245,392 discloses a donor roll for conveying toner in a development system. The roll includes a core of an electrically conductive material such as aluminum. The core is coated with a resin, for example a phenolic, to obtain a suitable conductivity to facilitate a discharge time constant of less than 300 microseconds.

U.S. Pat. No. 5,177,538 discloses a donor roll for a printer formed by mixing resin particles with conductive particles and subsequently extruding or centrifugal casting the mixture into a cylindrical shell. The shell is cut to the desired length and journals are attached to each end of the shell. The resin particles are thermoset particles preferably phenolic resin particles, and the conductive particles are preferably graphite particles.

U.S. Pat. No. 4,891,081 discloses a method of molding and a foamed resin molding in which a skin layer is formed by pressing an expandable film against and into conformity with cavity walls of a mold or a bag-like cover member by foaming pressure of a foamable resin and a foamed resin body molded concurrently and integrally under the skin layer.

U.S. Pat. No. 4,372,246 discloses in an externally heated fusing system, the improvement which includes providing an externally heated fuser member which is made of a base, a relatively thick layer of a foam of a fluoroelastomer on the base, and a relatively thin layer of a silicone elastomer on the foam layer. The silicone elastomer layer containing an iron oxide filler therein.

U.S. Pat. No. 4,327,008 discloses rheology modifiers useful in waterbased and organic solvent-based compositions are derived from the reaction of polyalkylene oxide, polyfunctional material, diisocyanate, water and a monofunctional active hydrogen-containing compound or monoisocyanate. The modifiers are characterized by having a branched structure, urea linkages and terminal hydrophobic groups.

U.S. Pat. No. 4,278,733 discloses a laminate product and method of making the same involving a base material such as cellulose fibrous materials impregnated with a cured mixture of aniline, phenol, formaldehyde and epoxy resin, which laminate has electrical and mechanical properties with improved heat resistance over previous materials.

U.S. Pat. No. 4,034,709 discloses a developer roll for a xerographic copier. The roll includes a tubular member made a non-magnetic metal for example aluminum. The roll is coated with a layer of styrene-butadiene. Magnets are disposed in the interior of the tubular member.

U.S. Pat. No. 3,616,046 discloses a laminated product possessing good physical and electrical properties made with an impregnating resin which is a reaction product of aniline, phenol and formaldehyde. These resins impart unusually good electrical and physical properties to the laminated product and are sufficiently water soluble as to allow their water content to be adjusted for direct, one stage impregnation of cellulose fiber materials such as paper.

Japanese Kokai Patent Application No. HEI 4{1992}-11966 discloses an improvement to equipment that coats liquid onto a sheet material such as paper or resin film. The equipment includes a smoothing device of a blade capable of being brought into contact with the sheet material so as to cross it and a pair of pulleys capable of moving the blade.

Japanese Kokai Patent Application No. HEI 7{1995}-178367 discloses a coating process that applies a coating solution to a rotating substrate surface from a coating solutions application tube moving along the axial direction of a horixzontally rotating cylinder. The smoothing of the coating is carried out by contacting the coating surface with a smoothing part moving along the axial line direction of the substrate.

Xerox Disclosure Journal entitled "Flow Coating Fixture", discloses an apparatus and method of mounting a chute on a lathe machine providing axis varying means of at least nine different positions for pouring or applying materials onto a rotating roll to coat the roll. The apparatus and method are useful for the preparation of various prototype rolls and provides excellent control for coating rolls uniformly.

"New Roll-Covering Process Uses RTV Silicones", discloses a technique for covering metal rolls with silicone rubber. To produce the coating a prepared mandrel is centered and locked in position on a standard metal working lathe. The elastomer is applied to the mandrel by pumping from a pail through a trough onto the mandrel.

U. S. application Ser. No. 08/672,493 discloses a polymeric printing member for use in a printing machine. The polymeric printing member includes a substrate and a coating applied to the substrate. The coating is applied to the substrate by rotating the substrate about its longitudinal axis and applying the coating from an applicator to the substrate in a spiral pattern in a controlled amount so that substantially all the coating that exits the applicator adheres to said substrate.

All the above references totally incorporated herein by reference.

In accordance with one aspect of the present invention, there is provided a guide for leveling the flow of a coating onto a substrate of a component in a machine. The substrate is rotatable about a longitudinal axis, whereby the coating is spirally applied to the substrate. The guide includes a member operably associated with the flow of the coating and operably associated with a slide movable with a direction parallel to the longitudinal axis. The member has a first end fixedly secured to the slide. The member has a second end spaced from the first end and fixedly secured to the slide. The member is resiliently cooperable with the periphery of the substrate and has a surface thereof slightly spaced from the periphery of the substrate. At least a portion of the flow of the coating may be positionable between the periphery of the substrate and the surface of the member so as to assist in evenly distributing the coating on the periphery of the substrate.

In accordance with another aspect of the present invention, there is provided a member for use in a machine. The member includes a substrate and a coating applied to the substrate. The coating is applied to the substrate by rotating the substrate about a longitudinal axis thereof and applying the coating to the substrate in a spiral pattern with a guide. The guide is operably associated with the flow of the coating and is operably associated with a slide movable with a direction parallel to the longitudinal axis. The guide has a first end fixedly secured to the slide. The guide has a second end spaced from the first end and fixedly secured to the slide. The guide is resiliently cooperable with the periphery of the substrate and has a surface thereof slightly spaced from the periphery of the substrate. At least a portion of the flow of the coating may be positionable between the periphery of the substrate and the surface of the guide so as to assist in evenly distributing the coating on the periphery of the substrate.

In accordance with yet another aspect of the present invention, there is provided a printing machine including a printing member. A printing machine including a printing member. The member includes a substrate and a coating applied to the substrate. The coating is applied to the substrate by rotating the substrate about a longitudinal axis thereof and applying the coating to the substrate in a spiral pattern with a guide. The guide is operably associated with the flow of the coating and is operably associated with a slide movable with a direction parallel to the longitudinal axis. The guide has a first end fixedly secured to the slide. The guide has a second end spaced from the first end and fixedly secured to the slide. The guide is resiliently cooperable with the periphery of the substrate and has a surface thereof slightly spaced from the periphery of the substrate. At least a portion of the flow of the coating may be positionable between the periphery of the substrate and the surface of the guide so as to assist in evenly distributing the coating on the periphery of the substrate.

BRIEF DESCRIPTION OF THE DRAWINGS

The invention will be described in detail herein with reference to the following figures in which like reference numerals denote like elements and wherein.

Figure 1:
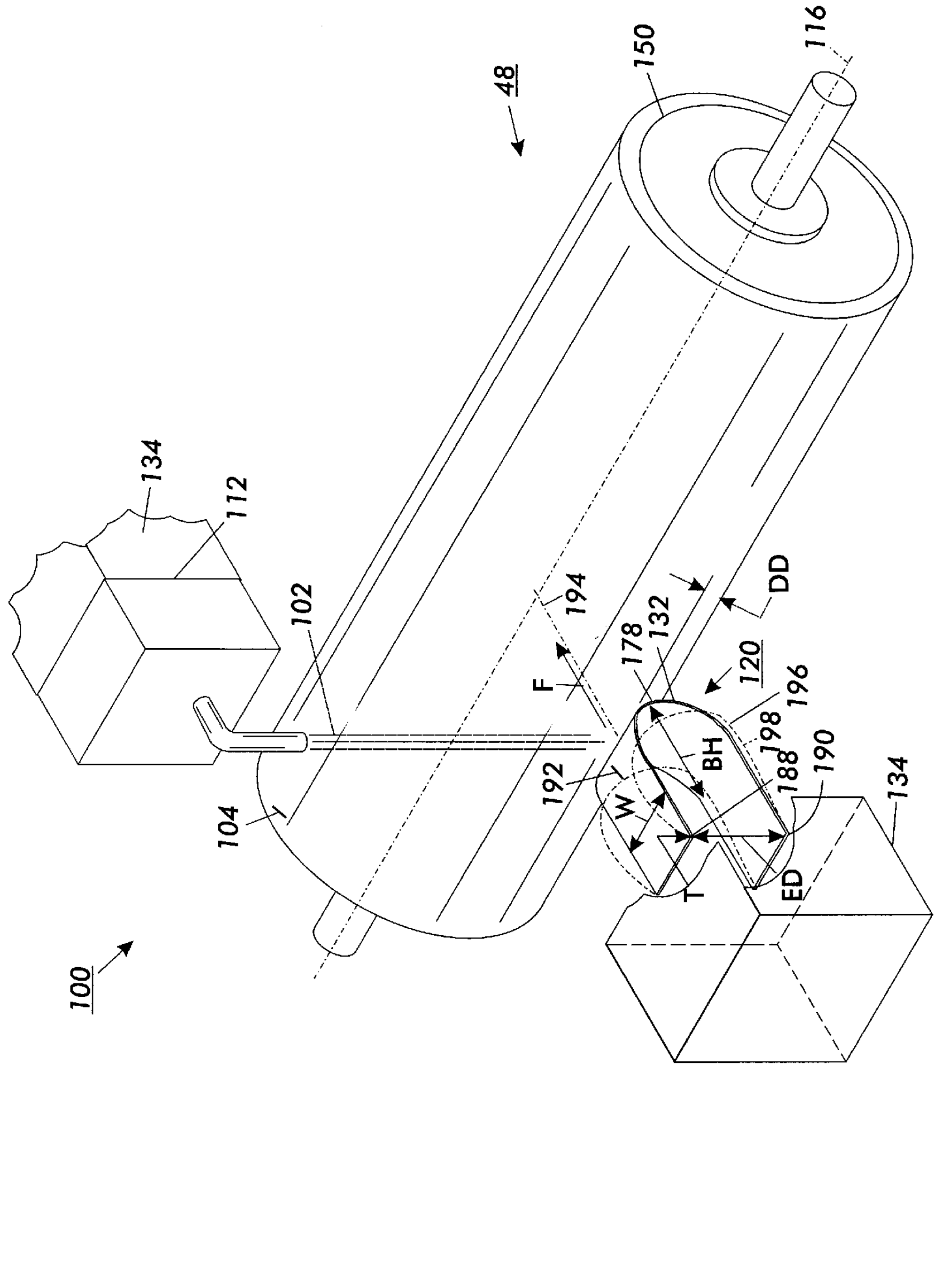
FIG. 1 is an perspective view of a flow coated fuser roll with a loop type blade according to the present invention in contact with the roll.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

For a general understanding of the features of the present invention, reference is made to the drawings. In the drawings, like reference numerals have been used throughout to identify identical elements.

Figure 2:
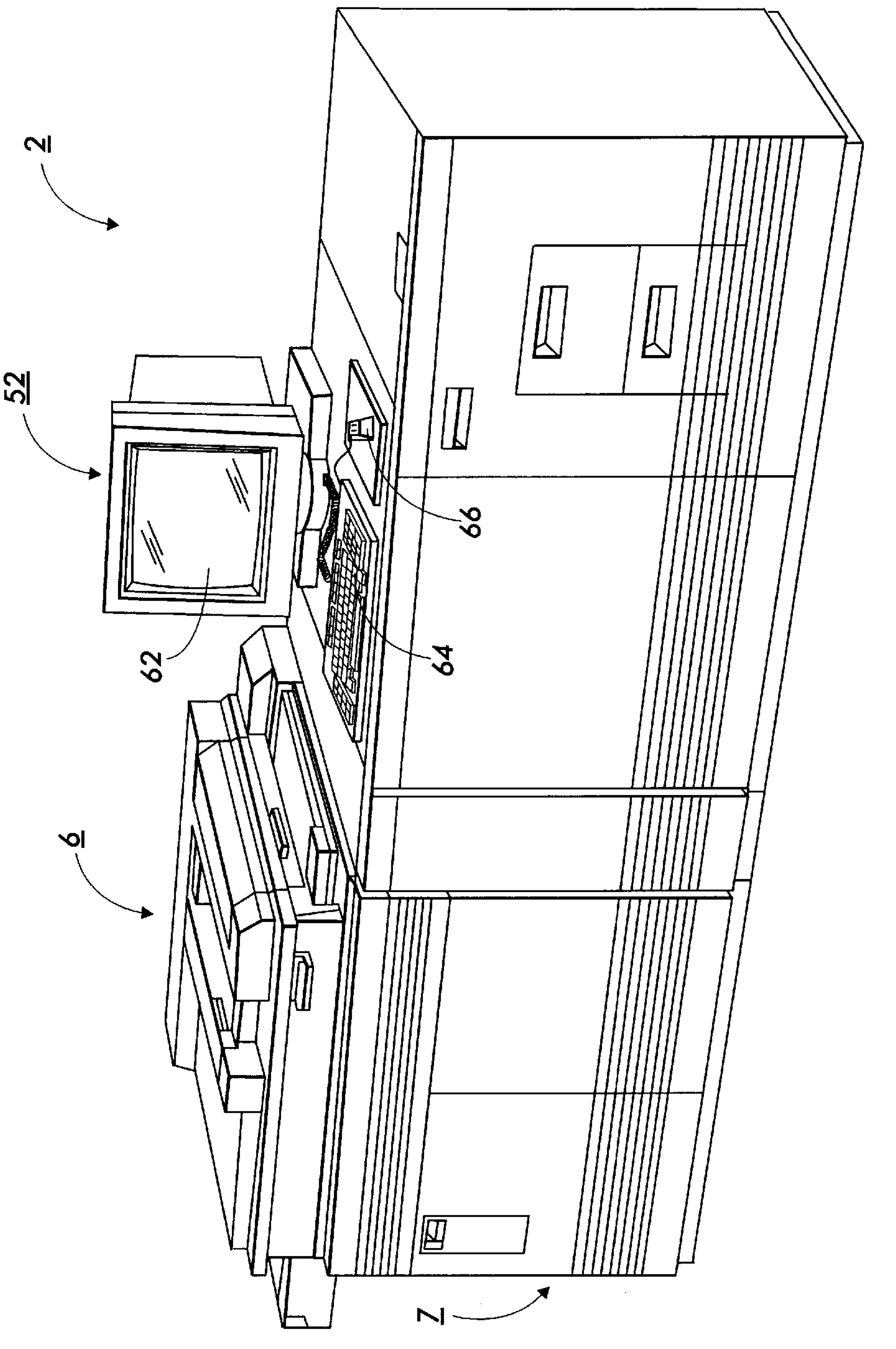
FIG. 2 is a perspective view of an illustrative electrophotographic printing machine incorporating the flow coated fuser roll made with the loop type blade of the present invention therein.

Referring first to FIG. 2 is an illustrative electrophotographic printing machine 2 incorporating the flow coated fuser roll of the present invention therein is shown. The machine includes an input device 6 such as a raster input scanner (RIS). An operator interface may be in the form of a cathode ray tube (CRT) including screen 62 for displaying the user interface commands. A keyboard 64 and a mouse 66 may be provided to provide for user interface with the machine 2. Machine controls 7 are housed in the machine to control its operation.

Figure 3:
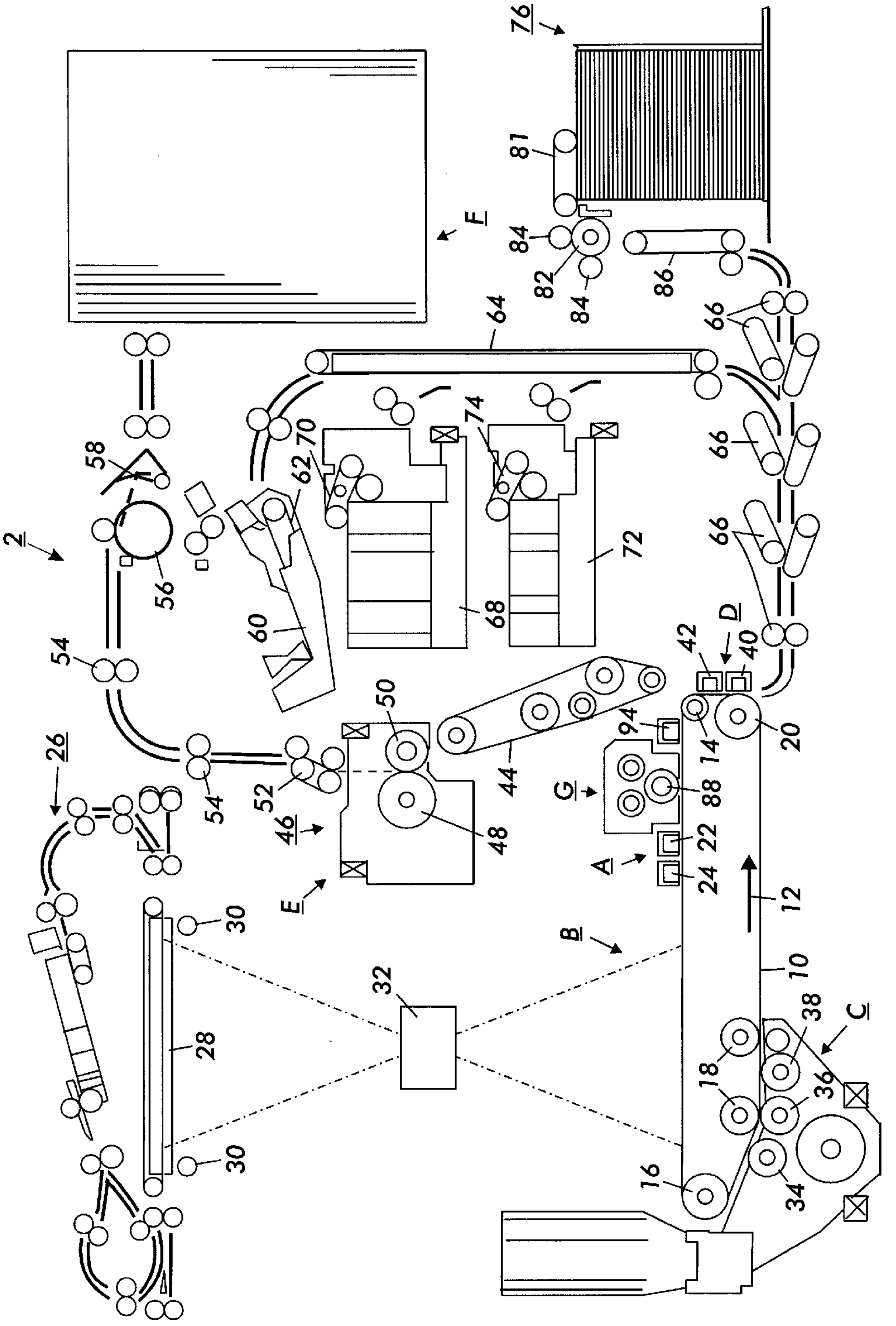
FIG. 3 is a schematic elevational view of the printing machine of FIG. 2.

Referring now to FIG. 3 an electrophotographic printing machine incorporating the features of the present invention therein are schematically depicted. It will become evident from the following discussion that the set transfer device of the present invention may be employed in a wide variety of machines and is not specifically limited in its application to the particular embodiment depicted herein.

Referring to FIG. 3 of the drawings, the electrophotographic printing machine employs a photoconductive belt

10. Preferably, the photoconductive belt 10 is made from a photoconductive material coated on a ground layer, which, in turn, is coated on an anti-curl backing layer. The photoconductive material is made from a transport layer coated on a selenium generator layer. The transport layer transports positive charges from the generator layer. The generator layer is coated on an interface layer. The interface layer is coated on the ground layer made from a titanium coated Mylar™. The interface layer aids in the transfer of electrons to the ground layer. The ground layer is very thin and allows light to pass therethrough. Other suitable photoconductive materials, ground layers, and anti-curl backing layers may also be employed. Belt 10 moves in the direction of arrow 12 to advance successive portions sequentially through the various processing stations disposed about the path of movement thereof. Belt 10 is entrained about stripping roller 14, tensioning roller 16, idler roll 18 and drive roller 20. Stripping roller 14 and idler roller 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of the photoconductive surface passes through charging station A. At charging station A, two corona generating devices indicated generally by the reference numerals 22 and 24 charge the photoconductive belt 10 to a relatively high, substantially uniform potential. Corona generating device 22 places all of the required charge on photoconductive belt 10. Corona generating device 24 acts as a leveling device, and fills in any areas missed by corona generating device 22.

Next, the charged portion of the photoconductive surface is advanced through imaging station B. At imaging station B, a document handling unit indicated generally by the reference numeral 26 is positioned over platen 28 of the printing machine. Document handling unit 26 sequentially feeds documents from a stack of documents placed by the operator faceup in a normal forward collated order in the document stacking and holding tray. A document feeder located below the tray, forwards the bottom document in the stack to a pair of take-away rollers. The bottom sheet is then fed by the rollers through a document guide to a feed roll pair and belt. The belt advances the document to platen 28. After imaging, the original document is fed from platen 28 by the belt into a guide and feed roll pair. The document then advances into an inverter mechanism and back to the document stack through the feed roll pair. A position gate is provided to divert the document to the inverter or to the feed roll pair. Imaging of the document is achieved by lamps 30 which illuminate the document on a platen 28. Light rays reflected from the document are transmitted through the lens 32. Lens 32 focuses light images of the document onto the charged portion of the photoconductive belt 10 to selectively dissipate the charge thereon. This records an electrostatic latent image on the photoconductive belt which corresponds to the informational areas contained within the original document.

Obviously, electronic imaging of page image information could be facilitated by a printing apparatus utilizing electrical imaging signals. The printing apparatus can be a digital copier including an input device such as a raster input scanner (RIS) and a printer output device such as a raster output scanner (ROS), or, a printer utilizing a printer output device such as a ROS. Other types of imaging systems may also be used employing, for example, a pivoting or shiftable LED write bar or projection LCD (liquid crystal display) or other electro-optic display as the "write" source.

Thereafter, belt 10 advances the electrostatic latent image recorded thereon to development station C. Development station C has three magnetic brush developer rolls indicated generally by the reference numerals 34, 36 and 38. A paddle wheel picks up developer material and delivers it to the developer rolls. When the developer material reaches rolls 34 and 36, it is magnetically split between the rolls with half of the developer material being delivered to each roll. Photoconductive belt 10 is partially wrapped about rolls 34 and 36 to form extended development zones. Developer roll 38 is a clean-up roll. A magnetic roll, positioned after developer roll 38, in the direction of arrow 12 is a carrier granule removal device adapted to remove any carrier granules adhering to belt 10. Thus, rolls 34 and 36 advance developer material into contact with the electrostatic latent image. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pretransfer light from a lamp (not shown) to reduce the attraction between photoconductive belt 10 and the toner powder image. Next, a corona generating device 40 charges the copy sheet to the proper magnitude and polarity so that the copy sheet is tacked to photoconductive belt 10 and the toner powder image attracted from the photoconductive belt to the copy sheet. After transfer, corona generator 42 charges the copy sheet to the opposite polarity to detack the copy sheet from belt 10. Conveyor 44 advances the copy sheet to fusing station E.

Fusing station E includes a fuser assembly indicated generally by the reference numeral 46 which permanently affixes the transferred toner powder image to the copy sheet. Preferably, fuser assembly 46 includes a heated fuser roller 48 and a pressure roller 50 with the powder image on the copy sheet contacting fuser roller 48. The pressure roller is cammed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 52. Decurler 52 bends the copy sheet in one direction to put a known curl in the copy sheet and then bends it in the opposite direction to remove that curl.

Forwarding rollers 54 then advance the sheet to duplex turn roll 56. Duplex solenoid gate 58 guides the sheet to the finishing station F, or to duplex tray 60. At finishing station F, copy sheets are stacked in a compiler tray and attached to one another to form sets. The sheets can be attached to one another by either a binder or a stapler. In either case, a plurality of sets of documents are formed in finishing station F. When duplex solenoid gate 58 diverts the sheet into duplex tray 60. Duplex tray 60 provides an intermediate or buffer storage for those sheets that have been printed on one side and on which an image will be subsequently printed on the second, opposite side thereof, i.e., the sheets being duplexed. The sheets are stacked in duplex tray 60 facedown on top of one another in the order in which they are copied.

In order to complete duplex copying, the simplex sheets in tray 60 are fed, in seriatim, by bottom feeder 62 from tray 60 back to transfer station D via conveyor 64 and rollers 66 for transfer of the toner powder image to the opposed sides of the copy sheets. Inasmuch as successive bottom sheets are fed from duplex tray 60, the proper or clean side of the copy sheet is positioned in contact with belt 10 at transfer station D so that the toner powder image is transferred thereto. The duplex sheet is then fed through the same path as the simplex sheet to be advanced to finishing station F.

Copy sheets are fed to transfer station D from secondary tray 68. The secondary tray 68 includes an elevator driven by a bidirectional AC motor. Its controller has the ability to drive the tray up or down. When the tray is in the down position, stacks of copy sheets are loaded thereon or unloaded therefrom. In the up position, successive copy sheets may be fed therefrom by sheet feeder 70. Sheet feeder 70 is a friction retard feeder utilizing a feed belt and take-away rolls to advance successive copy sheets to transport 64 which advances the sheets to rolls 66 and then to transfer station D.

Copy sheets may also be fed to transfer station D from auxiliary tray 72. The auxiliary tray 72 includes an elevator driven by a directional AC motor. Its controller has the ability to drive the tray up or down. When the tray is in the down position, stacks of copy sheets are loaded thereon or unloaded therefrom. In the up position, successive copy sheets may be fed therefrom by sheet feeder 74. Sheet feeder 74 is a friction retard feeder utilizing a feed belt and take-away rolls to advance successive copy sheets to transport 64 which advances the sheets to rolls 66 and then to transfer station D.

Secondary tray 68 and auxiliary tray 72 are secondary sources of copy sheets. The high capacity sheet feeder, indicated generally by the reference numeral 76, is the primary source of copy sheets. Feed belt 81 feeds successive uppermost sheets from the stack to a take-away drive roll 82 and idler rolls 84. The drive roll and idler rolls guide the sheet onto transport 86. Transport 86 advances the sheet to rolls 66 which, in turn, move the sheet to transfer station D.

Invariably, after the copy sheet is separated from the photoconductive belt 10, some residual particles remain adhering thereto. After transfer, photoconductive belt 10 passes beneath corona generating device 94 which charges the residual toner particles to the proper polarity. Thereafter, the pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 88 and two de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles. The toner particles on the reclaim roll are scraped off and deposited in a reclaim auger (not shown), where it is transported out of the rear of cleaning station G.

It is believed that the foregoing description is sufficient for purposes of the present application to illustrate the general operation of an electrophotographic printing machine incorporating a polymeric printing roll manufactured from the flowcoat process utilizing the loop type blade of the present invention therein.

The flow coating process for a fuser roll includes first the step providing a generally cylindrically shaped substrate. The substrate is rotated about a longitudinal axis of the substrate. A fluid coating is applied to the periphery of the substrate in a spiral pattern utilizing a guide to direct the coating onto the periphery of the substrate. To obtain optimum surface configuration, subsequent operations such as grinding to obtain a precision tolerance and superfinishing or polishing the outer periphery may also be required. To obtain optimum surface configuration, subsequent operations such as superfinishing or polishing the outer periphery may also be required.

As stated earlier, this flow coating process is applicable for multi layered printer rolls or belts, for example fuser rolls, e.g. the multi layered fuser roll of U.S. Pat. No. 5,217,837 to Henry et al, the relative portions thereof incorporated herein by reference. The surface condition and the geometry and size of the substrate may require accurate tolerances. Further, the substrate may need preparation to obtain a surface to which the fluid coating may adequately adhere. Applicants have also found that to obtain satisfactory results for rolls operating at elevated temperatures and pressures, for example fuser rolls, a preparation of an adhesive coating to the substrate may be required. The adhesive coating may be any suitable material, e.g. silane. Such an adhesive layer is disclosed in U.S. Pat. No. 5,219,612 to Bingham and in U.S. Pat. No. 5,049,444 to Bingham, the relevant portions thereof incorporated herein by reference.

Applicants have further found that a roll coated fuser roll may be made including coated layers of different materials. For example, a multi layered fuser roll may be utilized from this process such as a fuser roll described in U.S. Pat. No. 5,217,837 to Henry et al. Such a roll includes a top coating fabricated from a material to obtain optimum release of toner from the roll and a base coat fabricated from a material to obtain optimum thermal transfer. The coating may be applied in a solution with coating additives. Solutions with coating additives solids ranging from 15–30% have been tested and suitability of solutions appear to be dependent upon the material type and catalyst concentration. The coating may be applied at any satisfactory rate.

Figure 5:
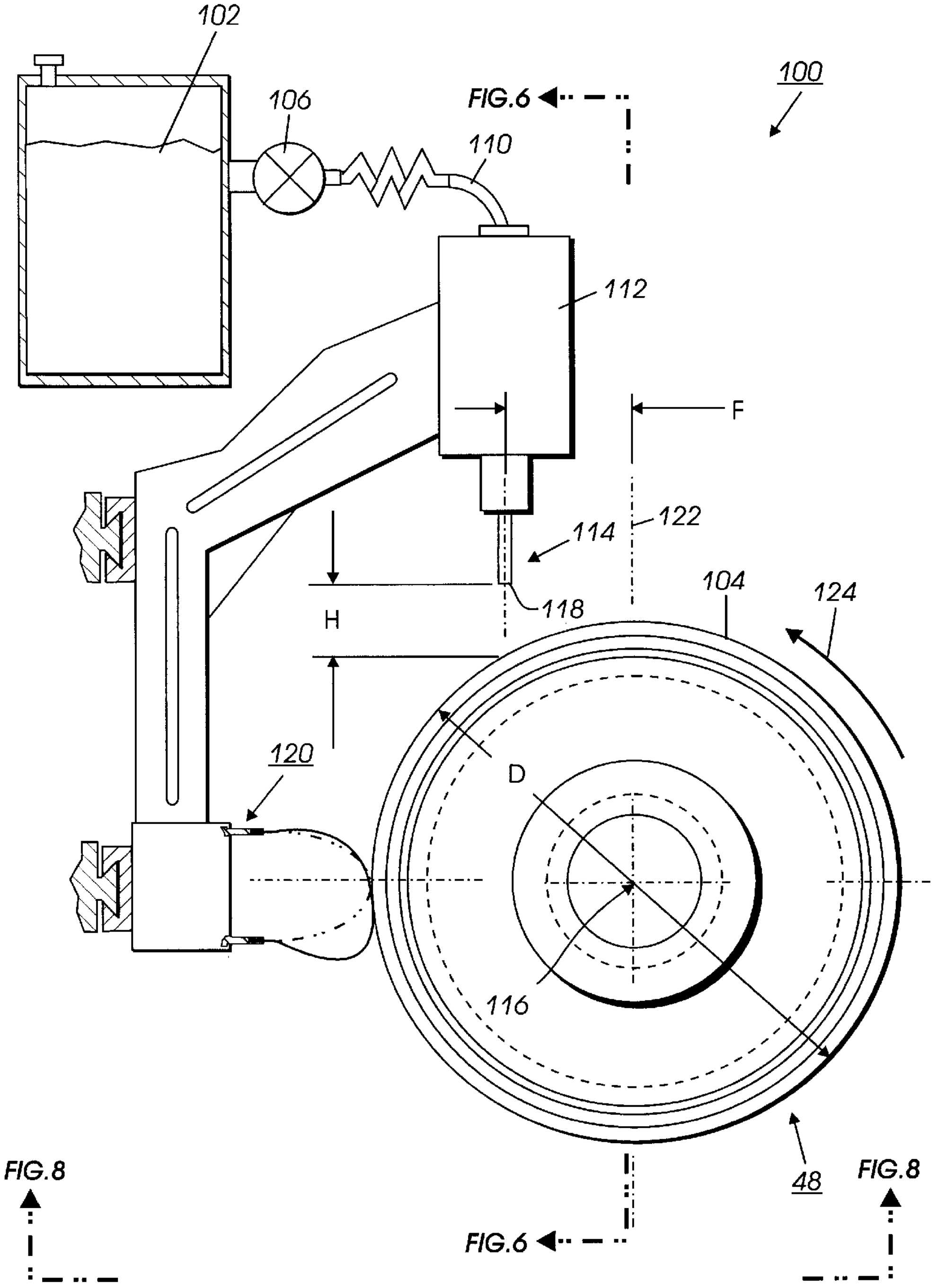
FIG. 5 is a partial end view along the line 5—5 in the direction of the arrows of the FIG. 4 turning apparatus.

Referring now to FIG. 5, apparatus 100 for coating polymeric printing rolls or belts for example xerographic fuser roll 48 is shown. It should be appreciated that the apparatus 100 may be utilized for flow coating any of a number of polymeric printing rolls or belts including but not limited to bias charge rolls (BCRs), bias transfer rolls (BTRs), pressure rolls, backup rolls, fuser donor rolls, intermediate transfer rolls and belts, photoconductive belts and rolls, development rolls and belts and development donor rolls and belts, and Hybrid Scavangeless Development. rolls and belts.

The apparatus 100 is used to apply coating solution 102 to periphery 104 of the fuser roll 48. The coating solution is pumped via pump 106 through a conduit typically in the form of a pipe 110 to an applicator 112 including nozzle 114 through which the coating solution 102 flows onto periphery 104 of the roll 48.

The coating solution 102 is applied to the periphery 104 in a spiral fashion with the fuser roll 48 rotating about its longitudinal axis 116, while the applicator 112 translates in a direction parallel to the longitudinal axis 116 of the fuser roll 48. The coating solution 102 is thus applied to the periphery 104 of the fuser roll 48 in a spiral fashion. The application of the coating is similar to the path of a cutting tool when turning the periphery of a shaft in a standard lathe. This process may be called (Flow Coating).

By accurately controlling the amount of coating solution 102 that is displaced through pump 106 and/or by controlling accurately in any manner the amount of coating solution 102 that is released at the nozzle 114 of applicator 112, substantially all the coating solution 102 that passes through the nozzle 114 adheres to the roll 48. The coating layer may be 5 to 250 microns thick. Being able to control the thickness of the coating with such precision will obviate the need for grinding and other post coating operations particularly for use in fusing color images where glossy finish on images is preferred. For black and gray tone images where a flat image is preferred the surface finish on the periphery of the roll 48 when using the Flow Coating process is too smooth and subsequent grinding and or polishing operations may be required to obtain the preferred dull or flat finish.

The apparatus 100 may have any suitable form and may consist of any equipment capable of rotating the fuser roll 48 about longitudinal axis 116 while translating the applicator 112 in a direction parallel to the longitudinal axis 116. Standard CNC or engine lathes may be used for this purpose. Specialty equipment may also be designed which will rotate the fuser roll while translating the applicator. Specialized equipment may be advantageous to permit the proper enclosure of the apparatus 100 to contain the volatile coating solution and to maintain the environmental conditions necessary for quality coatings from this process.

According to the present invention and referring to FIGS. 1 and 5, applicants have found that the placement of a member in the form of loop type guide 120 against the periphery 104 of the roll 48 as the coating solution 102 is applied to the roll, significantly improves the uniformity of the coating upon the roll 48. Preferably, the longitudinal axis 116 of the roll 48 is positioned horizontally with respect to the floor of the building in which the apparatus is housed. This configuration permits for the affects of gravity to properly distribute the coating solution 102 about the periphery 104 of the roll 48.

Similarly, the applicator 112 is preferably positioned above the fuser roll 48 so that the stream of coating solution coming from the nozzle 114 may rest upon the periphery 104 of the roll 48. Preferably, tip 118 of nozzle 114 is spaced a distance H above the periphery 104 of the roll 48. If the tip 118 is placed too far from the periphery 104 the coating solution 102 will evaporate before it reaches the periphery. If the tip 118 is placed too closely the periphery 104, the tip will hit the periphery 104. For a roll having a diameter D of approximately four inches, the applicants have found that a distance H of approximately 1/14 of an inch is adequate. Applicants have also found that positioning of the applicator tip 118 at a position F of approximately one inch from vertical axis 122 of the roll in the direction of rotation 124 of the roll. The dynamics of the rotation of the roll and its position on the periphery of the roll assist in the uniform distribution of the solution 102 on the periphery of the roll.

Accordingly to the present invention and referring now to FIG. 1, the applicants have found that apparatus 100 preferably includes the guide 120 to assist in properly distributing the solution 102 along the periphery 104 of the roll 48. The guide includes a member 132 preferably in the form of a loop type blade, for example, a spring steel have a thickness T of around 0.001 to around 0.005, such as a standard shim stock having a thickness of any of approximately 0.0010 inches, approximately 0.0015 inches and approximately 0.0020 inches.

The blade 132 is preferably connected to slide 134 of apparatus 100. Both the applicator 112 and the blade 132 are mounted on the slide 134 and are preferably positioned in a similar axial position along longitudinal axis 116 of the apparatus 100.

The member 132 includes a first end 188 which is fixedly secured to the slide 134. The member 132 further has a second end 190 spaced from the first end a distance of, for example, ED of say, for example, 1 inch. The second end 190 is fixedly secured to the slide 134. The member 132 resiliently cooperates with the periphery 104 of the substrate 150. The member 132 has a surface 192 of the member 132 which is slightly spaced from the periphery 104 of the substrate 150. At least a portion of the flow of the coating solution 102 from the applicator 112 may be positional both between periphery 104 of the substrate 150 and the surface 192 so as to assist in evenly distributing the coating solution 102 on the periphery 104 of the substrate 150.

Preferably, and as shown in FIG. 1, the member 132 is in the form of a resilient blade. As shown in FIG. 1, the blade 132 has preferably a substantially uniform cross section perpendicular to its length. For example, the blade 132 has a width W and thickness T. As shown in FIG. 1, the blade 132 has a width W which is substantially greater than its thickness T. For example, the member 132 may have a width W of 1 inch and thickness T of, for example, 0.001 to 0.005 inches when the blade 132 is made of, for example, stainless steel shim stock. Preferably, the blade 132 has a thickness T of from, for example, approximately 0.001 to 0.005 inches. As shown in FIG. 1, preferably, the blade 132 is flexible along width axis 194 perpendicular to the longitudinal axis 116 of the roll 48.

The blade 132 contacts the coating solution 102 at a contact surface 178 on the blade 132. The contact surface 178 is spaced a horizontal distance BH from the slide 134. The dimensions ED, BH, as well as the width W, the thickness T and the material utilized for the blade contribute to the resiliency of the blade 132 as well to the force that the blade may apply to the coating.

As the blade 132 brought into proximity with the roll 48, the blade 132 moves from its free position as shown in solid in FIG. 1 as first position 196 to its second position shown in phantom as 198. While in second position 198, the blade 132 may exert a force F upon coating solution 102 positioned between the roll 48 and the blade 132. The distance between the contact surface 178 in the first position and the second position may be defined by the deflection distance DD. The applicants have found for a blade 132 made of a shim stock of approximately 0.001 to 0.005 inches of stainless steel with a width W of 1 inch and a length BH of, for example, 1.5 inches and a dimension ED of one inch, a distance DD of 0.2 inches provides for a force F. The desired force F on the roll may vary due to the type and thickness of the material to be applied which is sufficient for providing a thickness coating of 0.001 inches upon the roll 48.

Figure 4:
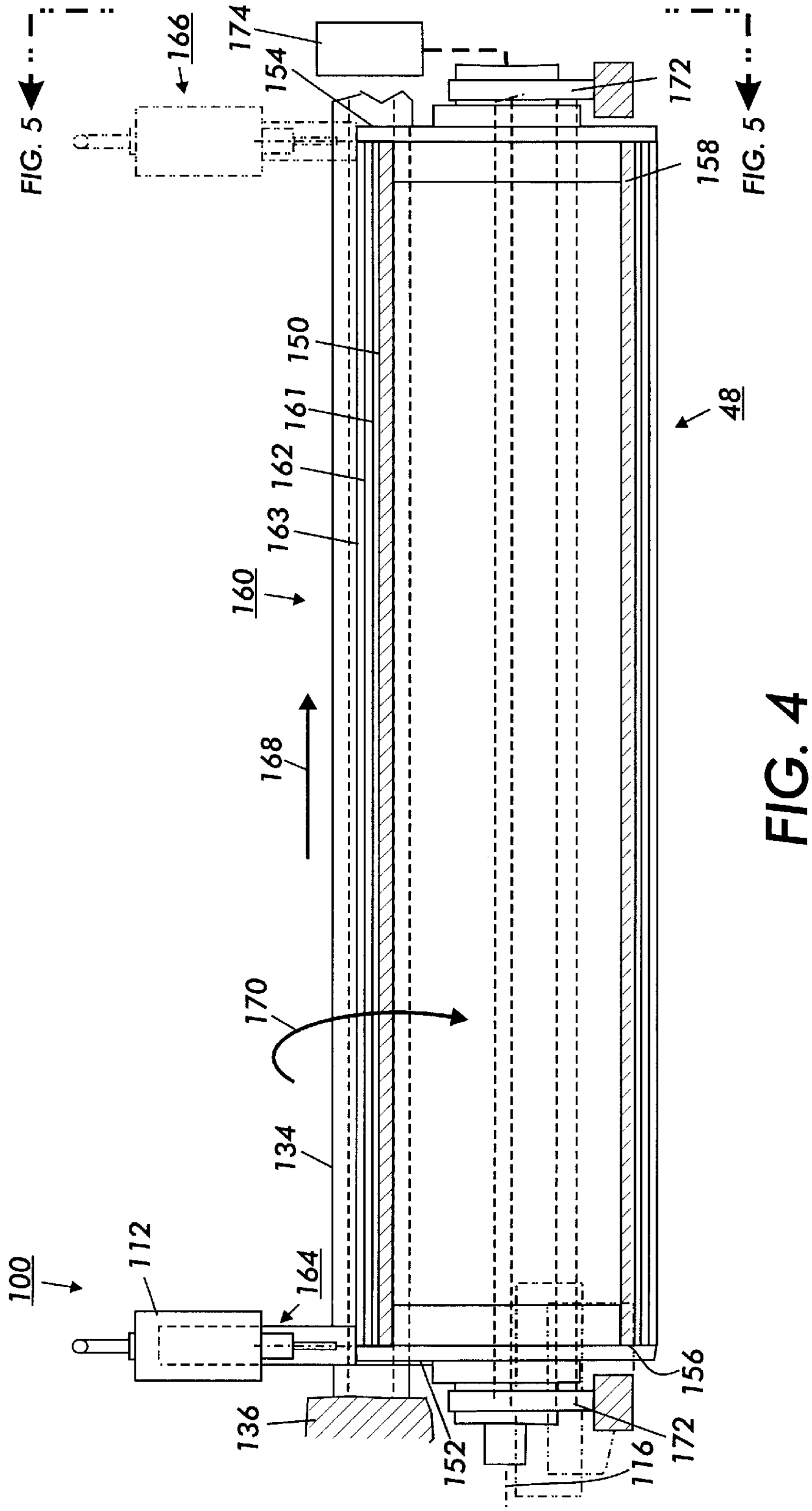
FIG. 4 is a is a elevational view partially in section of a flow coated fuser roll being prepared on a turning apparatus utilizing the loop type blade of the present invention.

Referring now to FIG. 4, the fuser roll 48 and the apparatus 100 are shown in greater detail. The fuser roll 48 may be made of any suitable durable material which has satisfactory heat transfer characteristics. For example, as shown in FIG. 4, the fuser roll 48 includes a substrate typically in the form of core 150 having a generally tubular shape and made of a thermally conductive material, for example, aluminum or a polymer. To provide for the driving of the roll, the roll 48 typically includes first end cap 152 and second end cap 154 located at first end 156 and second end 158 of the core 150, respectively.

Coating solution 102 (see FIG. 5) is used to apply coating 160 to the core 150. The coating 160 may be made of any suitable, durable material. For example, the coating 160 may be a fluoroelastomer. Preferably, the fluoroelastomer includes an additive to increase its thermal conductivity. One such additive to obtain the thermal conductivity is aluminum oxide. While a solitary coat may be applied to the core 150, preferably the coating 160 includes three separate, distinct layers. The first of these layers which is applied to the core 150 is an adhesive layer 161. Applied to the adhesive layer 161 is base coat 162 and applied to the base coat 152 is top coat 163.

The operation of the apparatus as shown in FIG. 4 is such that the applicator 112 translates from first position 164 as shown in solid to second position 166 as shown in phantom. The applicator 112 thus travels along with the slide 134 in the direction of arrow 168. The direction of travel of the applicator 112 is parallel to longitudinal axis 116 of fuser roll 48. Concurrently with the translation of the applicator 112, the roll 48 rotates in the direction of arrow 170. The roll 48 is supported in any suitable fashion such as by feed blocks 172 and is rotated in any suitable fashion such as by driver 174 which contacts end cap 154.

Figure 6:
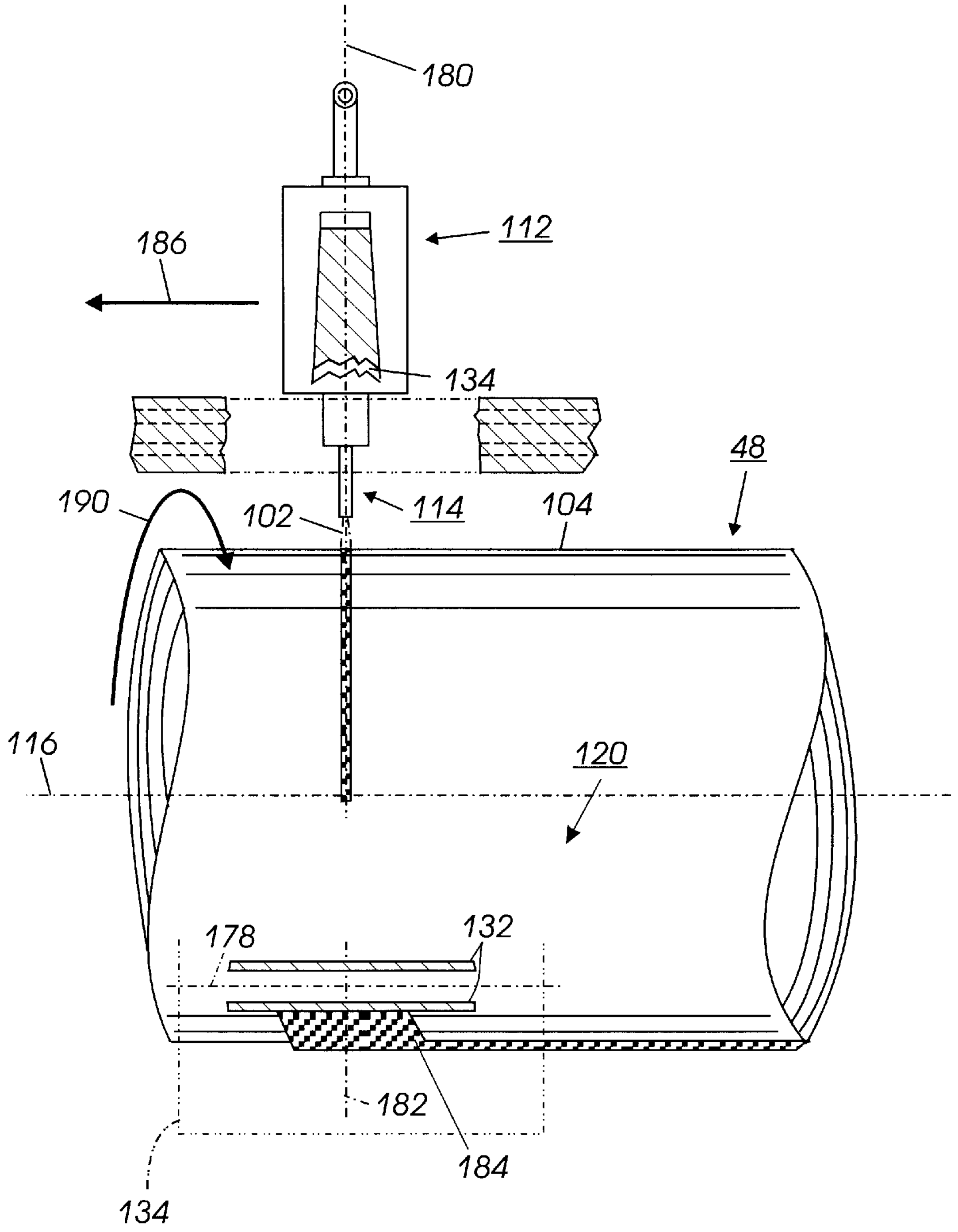
FIG. 6 is a partial elevational view along the line 6—6 in the direction of the arrows of the FIG. 5 turning apparatus.

Referring now to FIG. 6, the relative position of the applicator 112 relative to guide 120 is shown. Applicator 112 is positioned centrally about vertical applicator axis 180. The blade 132 of the guide 120 is positioned along the roll 48 in an axial position along the longitudinal axis 116 of the roll 48 such that the contact surface 178 of the blade 132 has a vertical centerline 182 which is in alignment along the longitudinal axis with applicator axis 180. The coating solution 102 coming from nozzle 114 is thus axially positioned in line with centerline 182 of the contact surface 178 of the blade 132. The coating solution 102 coming from the nozzle 114 forms a metered fluid layer 184 which is spirally positioned about periphery 104 of the roll 48. The applicator 112 and the guide 120 are both mounted on slide 134 and both move along in a direction parallel with longitudinal axis 116 of the roll in direction of arrow 186 as the roll 48 rotates in the direction of arrow 190.

Figure 7:
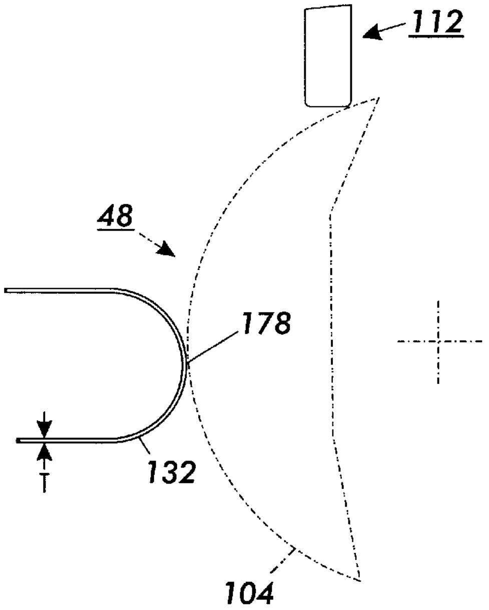
FIG. 7 is a partial end view of the loop type blade for use with the turning apparatus of FIG. 4 according to the present invention.
Figure 8:
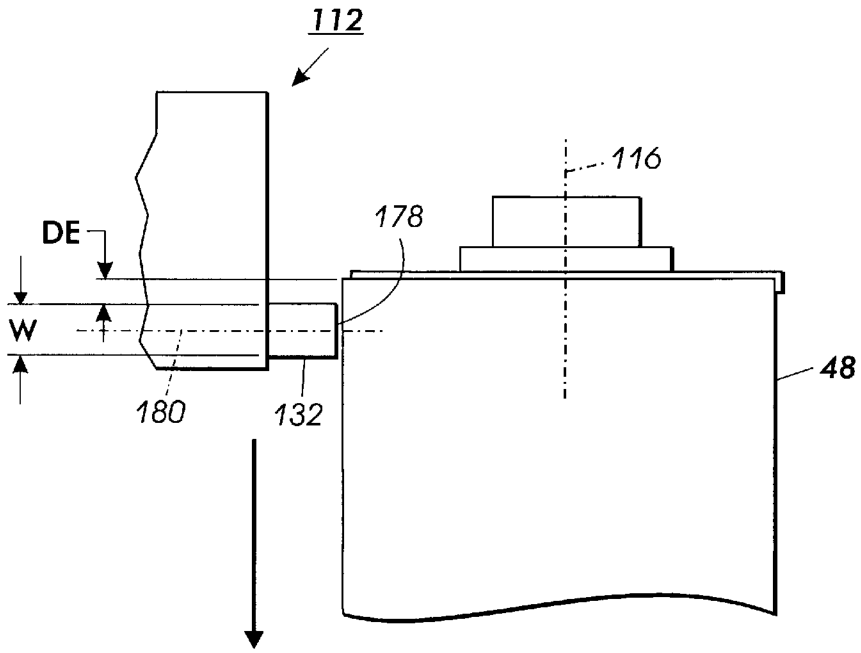
FIG. 8 is a bottom view along the line 8—8 in the direction of the arrows of FIG. 4.

Referring now to FIGS. 7 and 8, the position of the blade 132 relative to the applicator 112 is shown. For a blade having the contact surface 178 with a width W of 0.25 inches and a thickness T of 0.001 inches, the applicator axis 180 is at a position along longitudinal axis 116 of roll 48 equally spaced at a distance DE from each end of the contact surface 178 of the blade 132. The distance DE is varied dependant upon thickness of coating being applied, for example 0.001"for a 20 micron coating."

Figure 9:
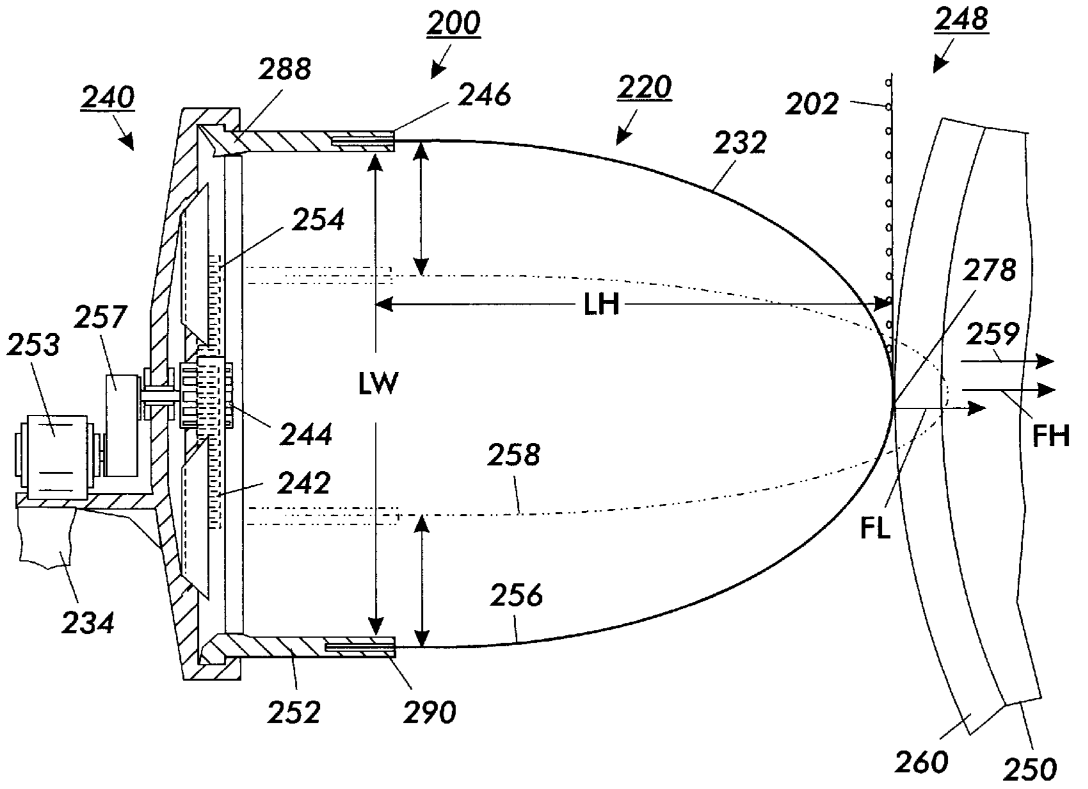
FIG. 9 is a partial end view of the loop type blade of the present invention in contact with a flow coated fuser roll.

Referring now to FIG. 9, an alternate embodiment of the flexible loop of the present invention is shown as guide 220 installed in apparatus 200. Apparatus 200 is similar to apparatus 100 of FIG. 1 except that guide 220 of apparatus 200 includes a loop blade 232 which is somewhat different than loop blade 132 of the guide 120 of FIG. 1 in that loop blade 232 includes a mechanism 240 for permitting first end 288 and second end 290 of the loop blade 232 to be moved with respect to each other. Any mechanism 240 may be utilized which provides for an ability for second end 190 to be moved with respect to the first end 188. The movement of the first end 190 and the second end 188 may be done manually or automatically and may be done by hand or by use of an external power source.

For example, as shown in FIG. 9, the mechanism 240 includes a rack 242 and pinion 244 which cooperate with each other to permit a first end holder 246 and a second end holder 252 to move along track 254 to permit the loop blade 232 to move from first position 256 as shown in solid to second position 258 as shown in phantom.

As shown in FIG. 9, the first end 288 is fixedly secured to the first end holder 246 and the second end 290 of the loop blade 232 is fixedly secured to the second end holder 252. As the loop blade 232 is moved from first position 256 to the second position 258, contact surface 278 of the loop blade 232 against the roll 248 moves in the direction of arrow 259. Therefore, as the ends 288 and 290 are moved with respect to each other, the distance LH from the mechanism 240 to the contact surface 278 changes. Thus, as the ends 288 and 290 are moved, the guide 220 must be moved either toward or away from the roll 248. Alternatively, to avoid the movement of the contact surface 278, the guide 220 may be configured such that the first and second ends 288 and 290 may be fitted to allowing sliding within the holders 246 and 252, respectively. Springs (not shown) may be utilized to urge the loop blade 232 outwardly toward contact with the roll 248. Loop blade force control may suffer with the use of these springs.

While the mechanism 240 to adjust the end holders 246 and 252 inwardly and outwardly may be manually adjusted, preferably, and as shown in FIG. 9, the mechanism 240 includes a power source in, for example, the form of an electric motor 255 which is connected by, for example, a belt 257 to the pinion 244 to permit the motor 252 to be utilized to adjust the positions of first end 288 and second end 290 of the loop blade 232.

As shown in FIG. 9, the distance between the opposed ends 288 and 290 of the loop blade 232 may be defined by a dimension LW and a dimension from the ends 288 and 290 of the loop blade to the contact surface 278 of the loop blade designated by dimension LH. By adjusting the dimensions LH and LW, the tension force applied by the loop blade 232 against the roll 248 may be adjusted. For example, at first position 252 shown in solid, the loop blade may exert low force FL while at the second position 258, the loop blade 232 may exert a higher force FH upon the roll 248.

Figure 10:
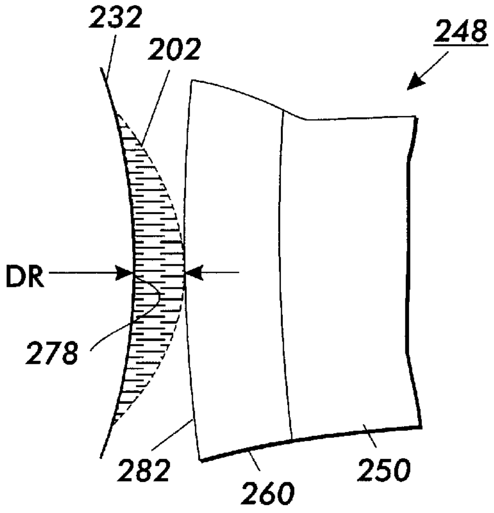
FIG. 10 is a partial enlarged end view of the portion of the loop type blade of FIG. 9 in contact with a flow coated fuser roll.
Figure 11:
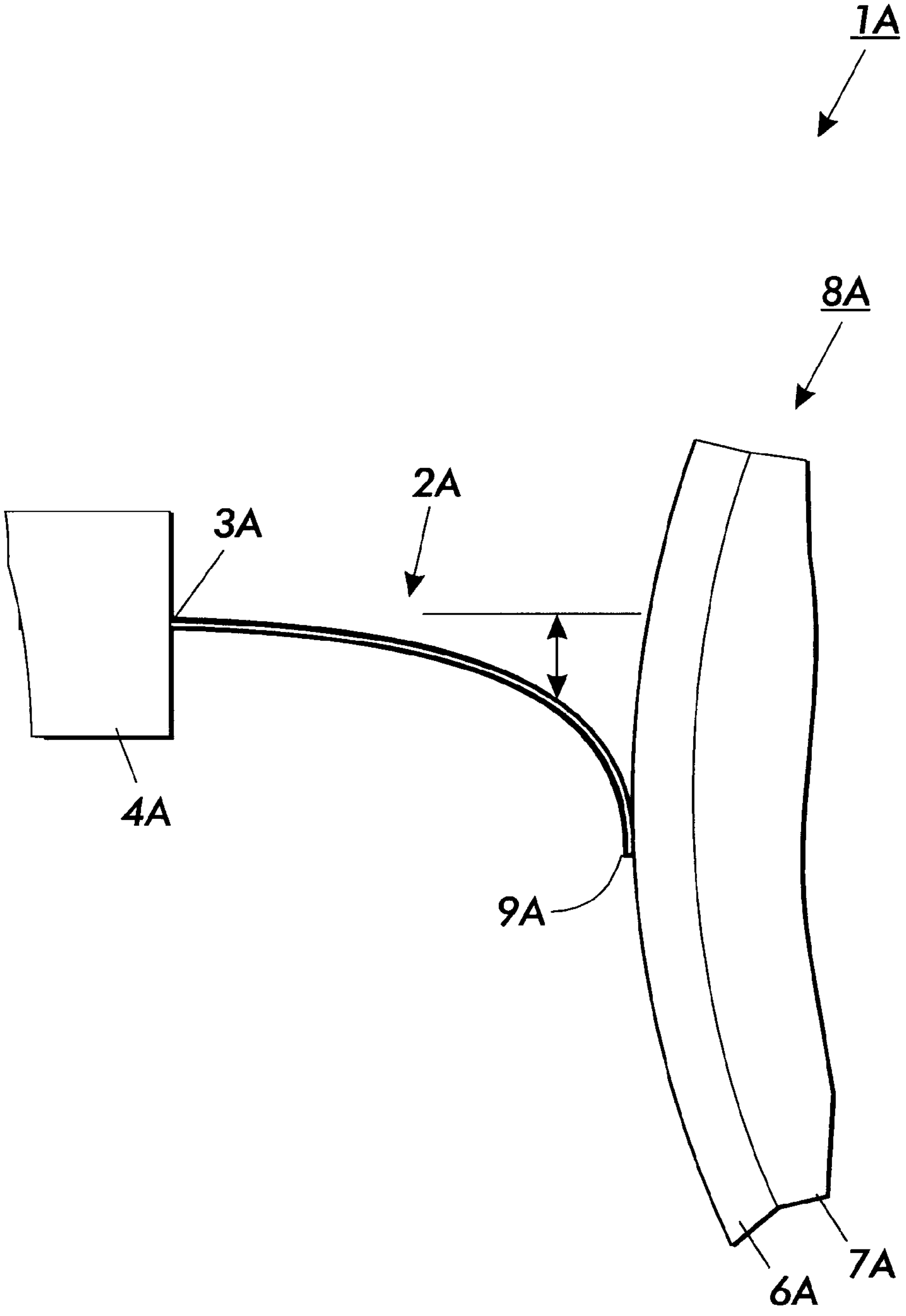
FIG. 11 (PRIOR ART)
FIG. 11 is a partial end view of a prior art leveling blade for use with a flow coated fuser roll.

Referring now to FIG. 10, coating solution 202 is shown trapped between the loop blade 232 and the coating 260 applied upon the core 250 of the roll 248. Each should be appreciated that the loop blade 232 is utilized to smooth the coating solution 202 along the coating 260 of the roll 248. The loop blade 232 is preferably adjusted with respect to the roll 248 to provide a distance DR between the surface 278 of the loop blade and the periphery 282 of the outer coating 260 of roll 248. Applicants have found that a dimension DR of approximately 0.0005 inches is sufficient to assist in providing for a smooth outer surface of the outer coating 260.

Figure 12:
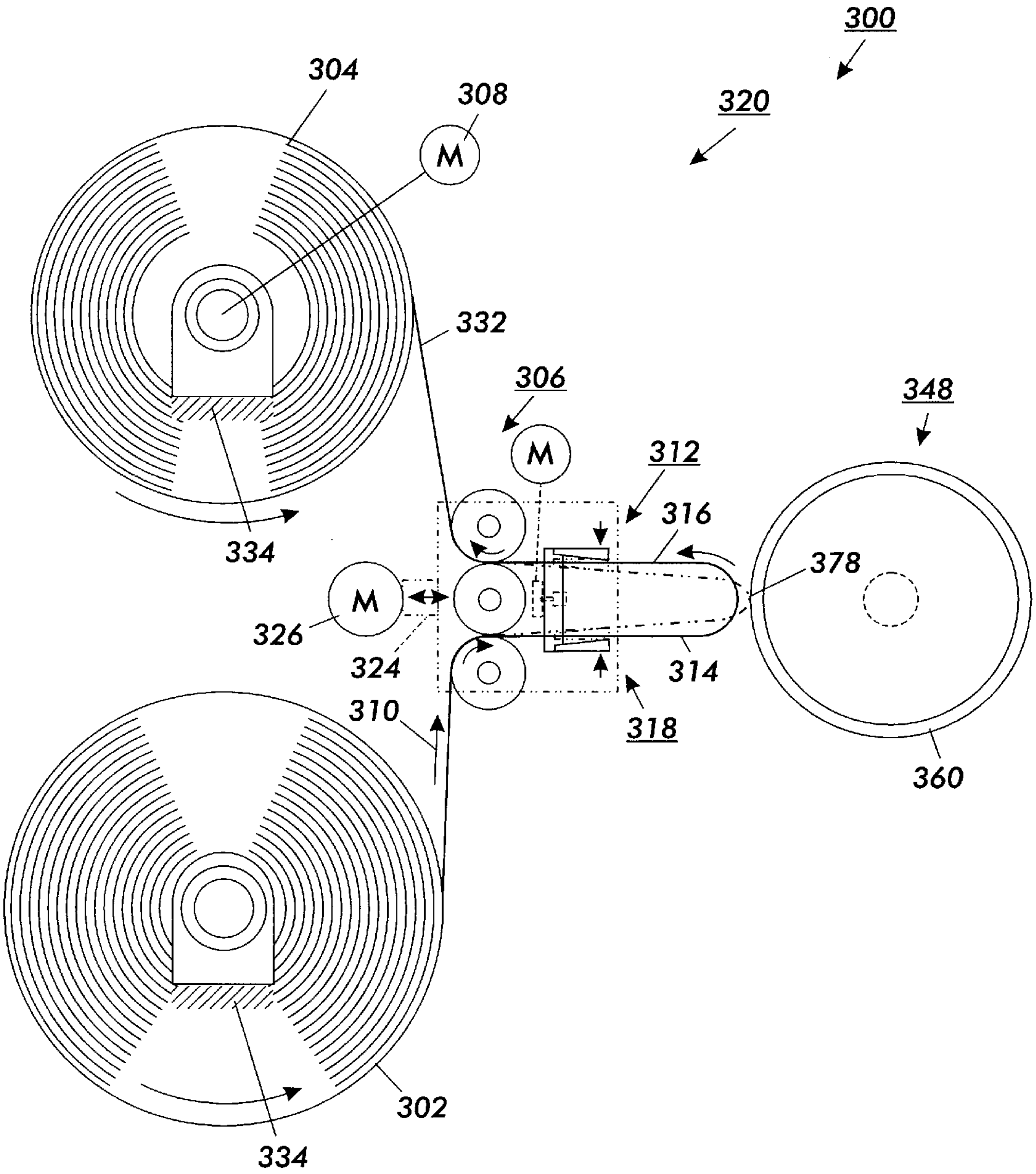
FIG. 12 is an end view of a reel type device for providing a band to be used as a loop type blade according to the present invention.

Referring now to FIG. 12, another alternate embodiment of the flexible loop blade of the present invention is shown as flow coating apparatus 300. The flow coating apparatus 300 includes a guide 320. The guide 320 includes blade 332 which is a flexible loop type blade but is different from the blade 132 of FIG. 1 in that blade 332 includes portions which are wrapped around an input reel 302 and output reel 304. The additional portions of the blade 332 which are wrapped around the input reel 302 and the output reel 304 permit the blade 332 to be advanced over time such that contact surface 378 of the blade 332 which is in contact with coating 360 of the roll 348 may be refreshed by moving a new portion of the blade 332 into contact with roll 348.

As shown in FIG. 12, the output reel 304 and the input reel 302 are rotatably attached to the slide 334. The blade 332 includes an advancing mechanism 306 which is utilized to advance the blade 332 from the input reel 302 to the output reel 304. The advancing mechanism 306 may be manual or may include an external power source in the form of, for example, motor 308 to drive the advancing mechanism 306 to advance the blade 332 in the direction of arrow 310.

While the guide 320 may provide for a blade 332 which has a fixed path, preferably and as shown in FIG. 12, the guide 320 includes an adjustment mechanism 312 for adjusting the distance between input portion 314 and output portion 316 of the blade 332. The adjustment mechanism 312 may be any mechanism and may manually or automatically adjusted. For example, and as shown in FIG. 12, the adjusting mechanism 312 includes a motor 318 for adjusting the distance between the input portion 314 and the output portion 31 6. By adjusting the distance between the input portion 314 and the output portion 316, the rigidity or strength of the blade and the force that the blade 332 may apply against the roll 348 may be adjusted.

As the adjusting mechanism 312 varies the distance between the input portion 314 and the output portion 316, the contact surface 378 of the blade 332 will move toward and away from the 348. Therefore, as shown in FIG. 12, the guide 320 may include an alignment mechanism 324 for moving the contact surface 378 into the proper position with respect to the roll 348. The alignment mechanism 324 may be manually adjusted or may include an external power source, for example, motor 326.

Figure 13:
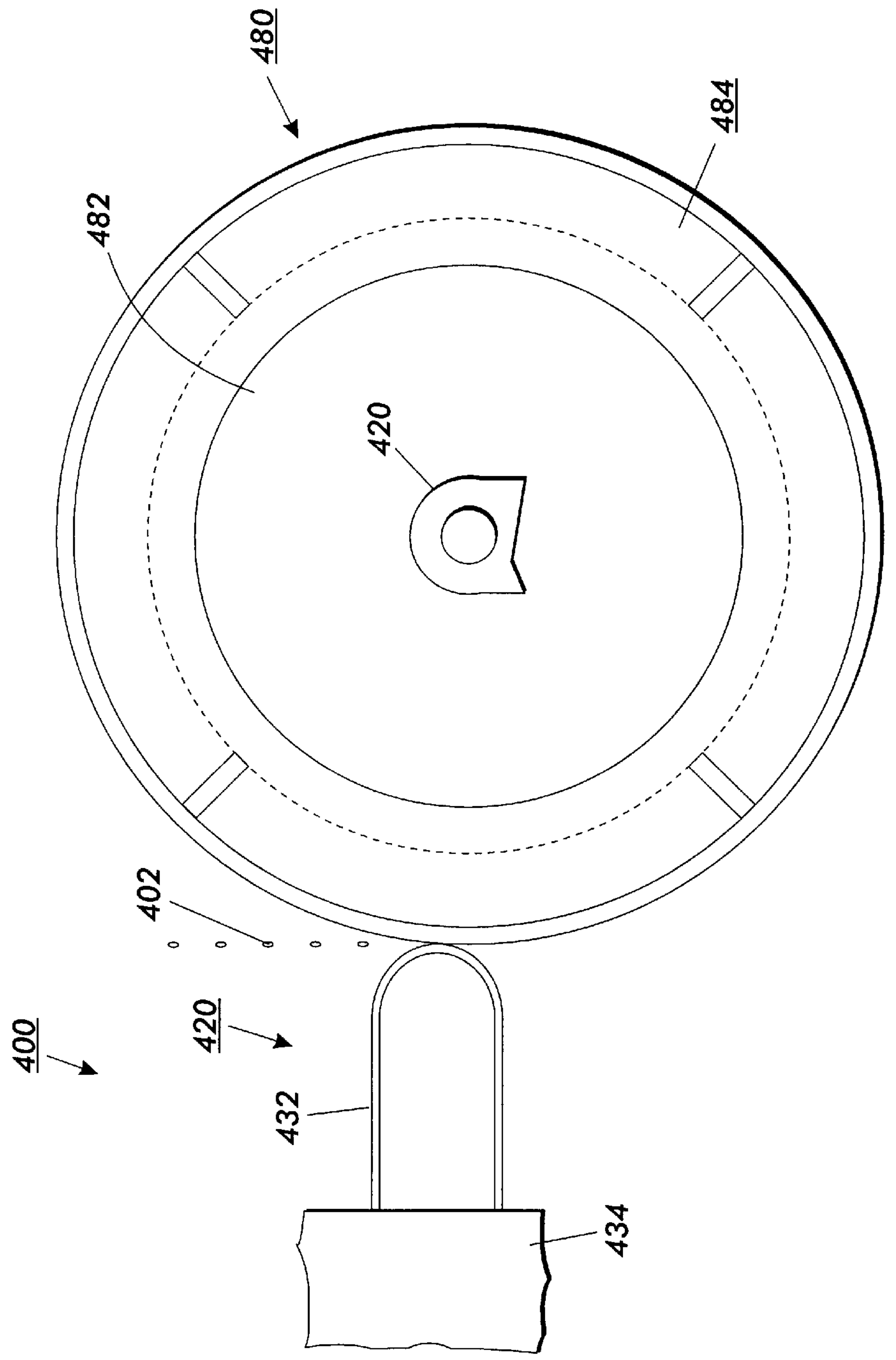
FIG. 13 is an end view partially in cross section of the loop type blade of the present invention in contact with a flow coated fuser belt mounted on an arbor.

While the loop blade of the present invention is particularly well suited for the coating of cylindrical rolls, the loop-type blade may be equally well utilized when coating flexible belts. Another embodiment of the loop-type blade of the present invention is shown as coating apparatus 400 as shown in FIG. 13 for use with coating flexible belts. The coating apparatus 400 includes a guide 420 which is similar guide 120 of FIG. 1. The guide 420 includes a loop-type blade 432 similar to blade 132 of FIG. 1 and is mounted to a slide 434 similar to slide 134 of FIG. 1. The loop-type blade 432 is utilized to apply a coating solution 402 similar to coating solution 102 of FIG. 1 onto a flexible belt 480. The flexible belt 480 is rotatably mounted by a mechanism, for example, an arbor 482 to rotating device 420. A mounting device is utilized to mount the belt 480 to the arbor 482. For example, a mechanical collet 484 may be utilized to expandly contact the belt 480 and to fixedly secure the belt 480 to the rotating arbor 482.

By providing a loop-type blade having opposed ends fixedly secured to the slide a smoothing may be utilized in the flow coating process which provides for improved tension control and improved surface condition of the resulted flow coated roll.

By providing a loop-type blade where opposed ends may be adjustably moved with respect to each other a leveling blade may be provided for the flow coating operation which provides variable tension to accommodate different coating thicknesses and coating viscosities.

By providing a loop-type blade which includes a contact surface which may be advanced, a blade for leveling the coating on flow coated roll may be provided which compensates for the wear of the blade.

By providing a loop-type blade having an advancing wear surface a flow coating operation may be provided with a blade which does not require frequent down time for replacement or repair of the leveling blade.

By providing a loop-type blade and mounted on reels a looptype blade may be provided with a continually advancing blade which provides for a fresh unworn blade to continually be utilized on the machine thereby eliminating downtime caused by blade wear and which provides for constant and uniform blade force and improved surface finish of the roll.

By providing a loop-type blade and mounted on reels the loop blade reels/shim stock are able to be recycled While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A guide for leveling the flow of a coating onto a substrate of a component in a machine, the substrate being rotated about a longitudinal axis, whereby the coating is spirally applied to the substrate, said guide comprising a member operably associated with the flow of the coating and operably associated with a slide movable with a direction parallel to the longitudinal axis, said member having a first end fixedly secured to the slide, said member having a second end spaced from said first end and fixedly secured to said slide, said member resiliently cooperable with the periphery of the substrate and having a surface thereof slightly spaced from the periphery of the substrate whereby at least a portion of the flow of the coating may be positionable between the periphery of the substrate and the surface of the member so as to assist in evenly distributing the coating on the periphery of the substrate.

2. The guide according to claim 1, wherein said member comprises a resilient blade.

3. The guide according to claim 2, wherein said blade has a substantially uniform cross section perpendicular to its length.

4. The guide according to claim 2, wherein said blade comprises a width substantially greater than its thickness.

5. The guide of claim 2, wherein said blade is flexible along a width axis perpendicular to the longitudinal axis.

6. The guide of claim 2, wherein the slide is positioned approximately perpendicular to the flow of the coating.

7. The guide of claim 2:

wherein the second end of said blade is securable to the slide in a first position spaced from the first end of said blade and wherein the second end of said blade is securable to the slide in a second position spaced from the first position; and further comprising a slidable bracket mounted to said slide, wherein at least one of said first end and said second end is slidable secured to said slide by said bracket such that the distance between said first end and said second end is adjustable.

8. The guide of claim 2, wherein said blade comprises a steel blade having a thickness of 0.001 to 0.005 inches.

9. The guide of claim 2, further comprising an advancing mechanism for advancing the portion of said blade proximate with the component such that different portions of the blade may cooperate with the roll to level the component.

10. The guide of claim 9, further comprising a reel for storing a portion of the blade.

11. A member for use in a machine, said member comprising:

a substrate; and a coating applied to said substrate; said coating applied to said substrate by rotating the substrate about a longitudinal axis thereof and applying the coating to said substrate in a spiral pattern with a guide, said guide operably associated with the flow of the coating and operably associated with a slide movable with a direction parallel to the longitudinal axis, said guide having a first end fixedly secured to the slide, said guide having a second end spaced from said first end and fixedly secured to said slide, said guide resiliently cooperable with the periphery of the substrate and having a surface thereof slightly spaced from the periphery of the substrate whereby at least a portion of the flow of the coating may be positionable between the periphery of the substrate and the surface of the guide so as to assist in evenly distributing the coating on the periphery of the substrate.

12. The member according to claim 11, wherein said guide comprises a resilient blade.

13. The member according to claim 12, wherein said blade has a substantially uniform cross section perpendicular to its length.

14. The member according to claim 12:

wherein the second end of said blade is securable to the slide in a first position spaced from the first end of said blade and wherein the second end of said blade is securable to the slide in a second position spaced from the first position; and further comprising a slidable bracket mounted to said slide, wherein at least one of said first end and said second end is slidable secured to said slide by said bracket such that the distance between said first end and said second end is adjustable.

15. The member of claim 12, wherein said blade comprises a steel blade having a thickness of 0.001 to 0.005 inches.

16. The member of claim 12, wherein the guide further comprises an advancing mechanism for advancing the portion of said blade proximate with the member such that a different portion of the blade cooperates with the roll to level the member.

17. A printing machine including a printing member, said member comprising:

a substrate; and a coating applied to said substrate, said coating applied to said substrate by rotating the substrate about a longitudinal axis thereof and applying the coating to said substrate in a spiral pattern with a guide, said guide operably associated with the flow of the coating and operably associated with a slide movable with a direction parallel to the longitudinal axis, said guide having a first end fixedly secured to the slide, said guide having a second end spaced from said first end and fixedly secured to said slide, said guide resiliently cooperable with the periphery of the substrate and having a surface thereof slightly spaced from the periphery of the substrate whereby at least a portion of the flow of the coating may be positionable between the periphery of the substrate and the surface of the guide so as to assist in evenly distributing the coating on the periphery of the substrate.

18. The printing machine according to claim 17, wherein said guide comprises a resilient blade.

19. The printing machine according to claim 18, wherein said blade has a substantially uniform cross section perpendicular to its length.

20. The printing machine according to claim 18:

wherein the second end of said blade is securable to the slide in a first position spaced from the first end of said blade and wherein the second end of said blade is securable to the slide in a second position spaced from the first position; and further comprising a slidable bracket mounted to said slide, wherein at least one of said first end and said second end is slidable secured to said slide by said bracket such that the distance between said first end and said second end is adjustable.

21. The printing machine according to claim 18, wherein said blade comprises a steel blade having a thickness of 0.001 to 0.005 inches.

22. The member of claim 18, wherein the guide further comprises an advancing mechanism for advancing the portion of said blade proximate with the member such that a different portion of the blade cooperates with the roll to level the member.

* * * * *